(12) United States Patent
Solares, Jr.

(10) Patent No.: US 11,641,850 B1
(45) Date of Patent: May 9, 2023

(54) ADJUSTABLE FISHING ROD HANDLE ASSEMBLY

(71) Applicant: Andres Solares, Jr., Miami, FL (US)

(72) Inventor: Andres Solares, Jr., Miami, FL (US)

( * ) Notice: Subject to any disclaimer, the term of this patent is extended or adjusted under 35 U.S.C. 154(b) by 16 days.

(21) Appl. No.: 17/347,943

(22) Filed: Jun. 15, 2021

(51) Int. Cl.
  *A01K 87/08* (2006.01)

(52) U.S. Cl.
  CPC ................................. *A01K 87/08* (2013.01)

(58) Field of Classification Search
  CPC .... A01K 87/08; A01K 87/008; A01K 87/009; A01B 1/026; B25G 1/00; Y10T 16/4713; Y10T 16/469; Y10S 16/41
  USPC ..... 43/25, 23; 16/110.1, 421, 422, 426, 430; 135/65, 66, 68, 69, 71–73, 76
  See application file for complete search history.

(56) References Cited

U.S. PATENT DOCUMENTS

| | | | |
|---|---|---|---|
| 2,149,837 A * | 3/1939 | Browne | A01K 87/08 43/25 |
| 2,819,081 A * | 1/1958 | Touraine | A63B 21/0618 482/45 |
| 3,014,750 A * | 12/1961 | Briggs | A01B 1/026 294/58 |
| 3,372,509 A * | 3/1968 | Arsenault | A01K 87/08 43/25 |
| 3,372,510 A * | 3/1968 | Arsenault | A01K 87/08 294/58 |
| 3,384,370 A * | 5/1968 | Bailey | A63B 21/0724 482/106 |
| 3,528,413 A * | 9/1970 | Aydt | A61F 5/013 5/650 |
| 5,159,775 A * | 11/1992 | Sutula, Jr. | A01K 87/08 294/58 |
| 5,313,735 A | 5/1994 | Latouche | |
| D353,262 S * | 12/1994 | Cantavespre | D22/139 |
| 5,363,586 A | 12/1994 | Balkenbush | |
| 5,426,884 A | 6/1995 | Makowsky | |
| 5,529,357 A * | 6/1996 | Hoffman | B25G 1/102 16/427 |
| 5,581,931 A | 12/1996 | Swisher | |
| 6,237,274 B1 | 5/2001 | Head et al. | |
| 6,295,755 B1 | 10/2001 | Macalus | |
| 6,347,477 B1 | 2/2002 | Hopper | |
| 6,705,041 B2 | 3/2004 | Hays | |
| 7,454,862 B2 | 11/2008 | Markley et al. | |
| D628,265 S * | 11/2010 | Schwartz | D3/221 |
| 7,854,086 B2 | 12/2010 | Huynh | |
| 7,955,157 B1 * | 6/2011 | Hedeen, Jr. | A63B 67/08 446/236 |
| 9,480,244 B2 | 11/2016 | Cooper | |

(Continued)

FOREIGN PATENT DOCUMENTS

| | | | | |
|---|---|---|---|---|
| GB | 2444318 A | * | 6/2008 | ............. A01K 87/08 |
| GB | 2496659 A | * | 5/2013 | ............. A01K 87/08 |
| WO | WO-2006014042 A1 | * | 2/2006 | ............. A01K 87/08 |

*Primary Examiner* — Darren W Ark
*Assistant Examiner* — Katelyn T Truong
(74) *Attorney, Agent, or Firm* — Albert Bordas P.A.

(57) ABSTRACT

An adjustable fishing rod handle assembly having a handle assembly and an arm support assembly. The handle assembly has an upper member, an interior bracket, and a lower member, whereby the upper member and the lower member are coupled, and the interior bracket is positioned inside the upper member and the lower member. The handle assembly and the arm support assembly are removable mounted onto a fishing rod.

9 Claims, 8 Drawing Sheets

(56) References Cited

U.S. PATENT DOCUMENTS

| | | | |
|---|---|---|---|
| 9,550,291 B2 | 1/2017 | Techlin | |
| 10,477,761 B1* | 11/2019 | Wrinkle | A01D 34/902 |
| 2005/0227831 A1* | 10/2005 | Mills | A63B 21/075 |
| | | | 482/106 |
| 2008/0176723 A1* | 7/2008 | Johnson | A63B 21/0724 |
| | | | 482/106 |
| 2010/0212209 A1 | 8/2010 | Canevari | |
| 2011/0287909 A1* | 11/2011 | Morris | A63B 23/12 |
| | | | 482/122 |
| 2012/0115688 A1* | 5/2012 | Cen | A63B 21/0724 |
| | | | 482/93 |
| 2012/0144964 A1* | 6/2012 | Lee | A01B 1/00 |
| | | | 81/489 |
| 2013/0193700 A1* | 8/2013 | Walden | A01B 1/024 |
| | | | 294/58 |
| 2013/0269131 A1* | 10/2013 | Mallett | A46B 5/0095 |
| | | | 15/144.1 |
| 2017/0347517 A1* | 12/2017 | Ahearn | B25G 3/04 |
| 2018/0243605 A1* | 8/2018 | Light | A63B 21/072 |
| 2020/0128793 A1* | 4/2020 | Fredrickson | A01B 1/026 |

* cited by examiner

ADJUSTABLE FISHING ROD HANDLE ASSEMBLY

BACKGROUND OF THE INVENTION

1. Field of the Invention

The present invention relates to handles for fishing rods, and more particularly, to adjustable fishing rod handle assemblies.

2. Description of the Related Art

Applicant believes that one of the closest references corresponds to U.S. Pat. No. 9,550,291 B2 issued to Techlin on Jan. 24, 2017 for Grip for generally rod shaped objects. However, it differs from the present invention because Techlin teaches a detachable grip with a bracket system that can be removably attached to a desired location along the length of a fishing rod, and that has a removable grip, which attaches to the bracket. More particularly, the bracket girdles the fishing rod using bolts to fasten a top half of the bracket to the bottom half of the bracket. The grip attaches to the bracket and extends in a direction away from the bracket that is substantially in a direction perpendicular to the rod. In one embodiment, the grip is attached to the bracket by a bolt, and is adapted to allow the grip to be readily detached.

Applicant believes that another reference corresponds to U.S. Pat. No. 9,480,244 B2 issued to Cooper on Nov. 1, 2016 for Handle system for fishing rod. However, it differs from the present invention because Cooper teaches a handle system operable in conjunction with a fishing rod and reel, which has an attachment section and a handle section. An arm of the attachment section is attached to a reel housing. The handle section has an upper handle that is connected to the arm and extends above the reel at an angle less than ninety degrees from the fishing rod.

Applicant believes that another reference corresponds to U.S. Pat. No. 6,705,041 B1 issued to Hays on Mar. 16, 2004 for Fishing rods. However, it differs from the present invention because Hays teaches a carrying handle fastened to a fishing rod to facilitate lifting and handling of the fishing rod that comprises a hand grip shaped and dimensioned for comfortable gripping in the hand, a clamp in the form of a diametrically split ring or split collar, which can be clamped securely to the fishing rod by tightening screw fasteners, and an arm, which connects the clamp to the hand grip. The handle is secured to the fishing rod so that the hand grip extends alongside the rod below the fishing reel seat.

Applicant believes that another reference corresponds to U.S. Pat. No. 7,854,086 B2 issued to Huynh on Dec. 21, 2010 for Fishing rod with ergonomic handle. However, it differs from the present invention because Huynh teaches a fishing rod with ergonomic handle, which places the angler's wrist in a more ergonomically correct position while waiting for a fish to strike. To accomplish this the fishing rod includes a flexible rod including a plurality of ferrules extending downward; a handle including a primary handle substantially parallel to and vertically above the flexible rod and a secondary handle extending upwards from the primary handle. The primary handle also includes a reel seat for downward attachment of a fishing reel. A transition structure is joined at one end to the flexible rod and at the opposing end to the upper portion of the secondary.

Applicant believes that another reference corresponds to U.S. Pat. No. 5,363,586 issued to Balkenbush on Nov. 15, 1994 for Dual-grip fishing rod handle. However, it differs from the present invention because Balkenbush teaches a fishing rod handle for providing a more comfortable and efficient grip during retrieving that includes two distinct grips, one to be utilized during the casting motion and a separate grip to be utilized during the retrieving motion. The handle includes a reel seat on which a fishing reel is mounted, and a casting grip defined on the handle behind the reel position. The handle further includes a retrieving grip, which is attached to the handle forward of the reel. The retrieving grip includes a support segment, which extends upwardly from the handle, and a gripping segment, which extends rearward from the support segment, so that the gripping segment is positioned above the fishing reel. This configuration is advantageous in that it provides the fisherman with a gripping location which facilitates improved balance, and which allows the fisherman to more comfortably and efficiently overcome the difficulties incurred due to the opposing upward and downward forces created during hook setting and fish retrieving.

Applicant believes that another reference corresponds to U.S. Pat. No. 6,347,477 B1 issued to Hopper on Feb. 19, 2002 for Fishing rod with stress relief grip and forearm support. However, it differs from the present invention because Hopper teaches a forearm support member or saddle, which is placed under the forearm of the user near the hand grip whereby the user has better control of the fishing rod. The saddle member is designed to relieve stress on the wrist of the user and to aid the user in fighting bigger fish. The saddle member is also used to control the pressure on the rod from the underarm area of the user for use when the user is bottom fishing with the rod. Also shown is a rod member having a longer rear portion and a shorter front portion having an angular hand grip therein between and further having a saddle member 16 mounted thereon. A locking member is shown for placement of the fishing reel onto the forward member. Also, the forward rod member has an aperture or other means for receiving the butt of a fishing rod or fishing rod blank.

Applicant believes that another reference corresponds to U.S. Pat. No. 3,372,509 A issued on Mar. 12, 1968 for Fishing rod handling device. However, it differs from the present invention because Arsenault teaches a handling device for a fishing rod having conventional or suitable means for removably mounting a reel on the rod in which an upwardly and slightly forwardly extending hand grip is mounted on the rod. The device having one or more arms directly and removable mounting and securing the hand grip to reel.

Applicant believes that another reference corresponds to U.S. Pat. No. 3,372,510 A issued to Albert J. Arsenault on Mar. 12, 1968 for Fishing rod handling device. However, it differs from the present invention because Arsenault teaches a handling device for fishing rods comprising a sleeve, which embraces and is relatively clamped to the handle of the rod.

Applicant believes that another reference corresponds to U.S. Pat. No. 7,454,862 B2 issued to Markley, et al. on Nov. 25, 2008 for Fishing pole handle hinge assembly and fishing pole handle. However, it differs from the present invention because Markley, et al. teach a fishing pole handle hinge assembly with a first handle element, a second handle element, and a clamp. The first handle element terminates in a contact surface having a socket. The second handle element terminates in a contact surface having a tapering head configured to be received for pivotal positioning within a socket. The claim extends between the socket and the head.

The clamp is configured to compress together the socket and the head to prevent movement of the socket relative to the head.

Applicant believes that another reference corresponds to U.S. Pat. No. 5,313,735 issued to Latouche on May 24, 1994 for Rotatable handle extension for fishing rods and the like. However, it differs from the present invention because Latouche teaches a rotatable mechanism for reversibly attaching an extension onto a long member, examples include an ergonomically correct extension, which fits and supports the entire natural shape of the arm, from the heel of the hand, along the inner wrist and up the forearm, thus combining the principle of leverage with the body's natural muscular dynamics, to transfer the load and strain away from the wrist to the more powerful muscles of the upper arm and shoulder. Splines run on the outside of a shaft affixed previously to a handle, and co-operate with splines on the inside surface of a cylindrical hole in the extension. A screw inserted through the extension and threaded into a hole in the end of the handle prevents longitudinal separation between the handle and extension, and the splines prevent rotational movement. In cases where the handle needs to be rotated, such as a fishing reel designed to hang down instead of up, the screw is released, the extension disengaged, rotated, reinserted, and the screw is inserted and tightened. A second embodiment describes a simple screw-on clamp to achieve the same function, while incorporating adjustable sizing bushings so the extension can be an integral part of differing sizes and shapes of handles, including frying pans, shovels, garden equipment, geriatric aids, jack-hammers, and the like. Both forms of the rotatable extension also permit easy adjustment to comfortably accommodate right- or left-handed users.

Applicant believes that another reference corresponds to U.S. Pat. No. 5,581,931 issued to Swisher on Dec. 10, 1996 for Rigidly braced auxiliary rod handle. However, it differs from the present invention because Swisher teaches a braced handle of high rigidity and light weight that includes an auxiliary hand grip, a frame and removable attachment by cinctures spaced apart linearly along a casting rod forward of the reel. The frame possesses a rearward portion, an upper medial portion and a forward portion. The rearward frame portion extends upward from the rod forward of the reel with a small inclination forward from normal to the length of the rod about which a resilient hand grip may be located. The upper medial portion rigidly connects the upper end of the rearward frame portion with the upper end of the forward frame portion, which extends upwardly from the rod. The frame may further possess a lower portion parallel to and flush with the rod extending from said rearward and forward frame portions. Attachment of the handle to the rod may be made along this lower portion or simply at the lower ends of the rearward and forward portions of the frame. Either disposition effects a linear attachment of the handle with the rod within the substantially vertical plane in which a casting rod is typically displaced during fishing. A layer of resilient material may also be located about the rod where attachment is made to protect the rod surface and resist cincture slippage. The auxiliary hand grip thus provided is rigidly braced at both lower and upper ends which enables lightweight construction and high sensitivity, in control of the rod. The frame also provides a handle for manual transport of the rod and reel in a substantially horizontal disposition.

Applicant believes that another reference corresponds to U.S. Pat. No. 6,295,755 B1 issued to Macalus on Oct. 2, 2001 for Adjustable arm support for fishing rod handle. However, it differs from the present invention because Macalus teaches a device supporting the arm of a fisherman using a spinning-type fishing rod having a cylindrical rod handle, comprising an adjustable rotatable arm cradle supporting the upper forearm of the fisherman, a partially cylindrical elongated handle support member defining a partially cylindrical compartment that holds a selected area of the fishing rod handle in alignment with the arm cradle, an adjustable post connecting the arm cradle means with the handle, and an adjustable clamp for removably gripping the rod handle to the handle support. The arm cradle is rotatable to a selected angle relative to the rod handle and is removably lockable at the selected angle. The connecting post can be lengthened or shortened to a selected position and removably locked at that position. The clamp that presses the fishing rod handle against the top of the holding compartment of the handle support member is adjustable by means of a vertical screw that raises or lowers the clamp.

Applicant believes that another reference corresponds to U.S. Pat. No. 5,426,884 issued to Makowsky on Jun. 27, 1995 for Fishing rod handle assembly. However, it differs from the present invention because Makowsky teaches a supplementary handle disposed above a top mounted reel to a fishing rod handle to permit a user to simultaneously grasp the supplementary handle with one hand and an axial rod handle with the other hand. A bracket mechanism mounts the supplementary handle to the fishing rod handle so that the supplementary handle is disposed above the top mounted reel and is spaced apart to allow space for a user's fingers to be placed between the supplementary handle and the reel. This provides the user with an additional holding mechanism for controlling the fishing rod thereby making the hand position change from casting to retrieving easily accomplished, and reducing undesired torque during line retrieval.

Applicant believes that another reference corresponds to U.S. Pat. No. 6,237,274 B1 issued to Head, et al. on May 29, 2001 for Fishing rod handle attachment. However, it differs from the present invention because Head, et al. teach a fishing rod handle attachment comprised of a handle, a handle extension for positioning the handle directly above the fishing rod, and an attaching device for rigidly attaching the handle attachment to the fishing rod. The handle is comprised of an elongated member and a support member. The elongated member is gripped by a user's hand while the user is fishing, the elongated member being transverse to the fishing rod, horizontally oriented, and positioned directly above the fishing rod when the fishing rod is being used for fishing. The support member is rigidly attached to the elongated member and provides the means for attaching the elongated member to the handle extension.

Applicant believes that another reference corresponds to U.S. Patent Application Publication No. 2010/0212209 A1, published on Aug. 26, 2010 to Raymond A. Canevari for Fishing rod support. However, it differs from the present invention because Canevari teaches a fishing rod support providing support or bracing for the handle or butt of a fishing rod against a portion of the angler's body. The support includes an elongate pad joined to a crosspiece having three sockets. When the butt of the rod is placed in either of the two aligned sockets, the pad is generally parallel to the rod. This allows the pad to be placed under the arm to restrain upward movement of the rod butt as the angler lifts the rod. Alternatively, the butt of the rod may be placed in the third socket, with the pad aligned generally perpendicular to the rod. In this configuration, the pad is placed against the forward body of the angler for bracing. The fishing rod support is particularly useful for anglers having back pain or limited upper body strength.

Other patents describing the closest subject matter provide for a number of more or less complicated features that fail to solve the problem in an efficient and economical way. None of these patents suggest the novel features of the present invention.

SUMMARY OF THE INVENTION

The present invention is an adjustable fishing rod handle assembly comprising a handle assembly and an arm support assembly. The handle assembly has an upper member, an interior bracket, and a lower member, whereby the upper member and the lower member are coupled, and the interior bracket is positioned inside the upper member and the lower member. The handle assembly and the arm support assembly are removable mounted onto a fishing rod.

The upper member, the interior bracket, and the lower member are ring-shaped, and the arm support assembly is curved. The upper member comprises an upper member exterior face, an upper member interior face, an upper member top end, and an upper member bottom end. The upper member top end defines an upper channel toward the upper member interior face. The upper member bottom end defines a lip having external threads. The interior bracket comprises a bracket exterior face, a bracket interior face, a bracket top end, a bracket bottom end, and a handle. The handle crosses diametrically at the bracket interior face.

The lower member comprises a lower member exterior face, a lower member interior face, lower member top end, a lower member bottom end, and a lower member elongated support. The lower member top end defines internal threads at the lower member interior face. The lower member bottom end defines a lower channel toward the lower member interior face. The lower member elongated support is substantially perpendicular to the lower member bottom end. The lower member elongated support comprises a distal holder base having a distal holder channel and a distal aperture to receive a distal adjustable strap. The distal holder base is at the lower member exterior face. The upper channel receives the bracket top end and the lower channel receives the bracket bottom end, whereby the interior bracket is able to rotate within said upper member interior face and said lower member interior face. The internal threads receive the external threads to secure the upper member to the lower member.

The arm support assembly comprises an arm support exterior face, an arm support interior face, first and second lateral supports, an elongated support, an arm support top end, and an arm support bottom end. The elongated support is substantially perpendicular to the first and second lateral supports. The elongated support comprises a proximal holder base having a proximal holder channel and a proximal aperture to receive a proximal adjustable strap. The proximal holder base extends at the arm support exterior face. The handle assembly and the arm support assembly are mounted onto the fishing rod whereby the distal adjustable strap and the proximal adjustable strap secure the fishing rod to the distal holder base and the proximal holder base respectively.

It is therefore one of the main objects of the present invention to provide an adjustable fishing rod handle assembly.

It is another object of this invention to provide an adjustable fishing rod handle assembly for better handling a fishing pole.

It is another object of this invention to provide an adjustable fishing rod handle assembly in which a handle rotates.

It is another object of this invention to provide an adjustable fishing rod handle assembly that is volumetrically efficient for carrying, transporting, and storage.

It is another object of this invention to provide an adjustable fishing rod handle assembly that can be readily assembled and disassembled without the need of any special tools.

It is another object of this invention to provide an adjustable fishing rod handle assembly, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
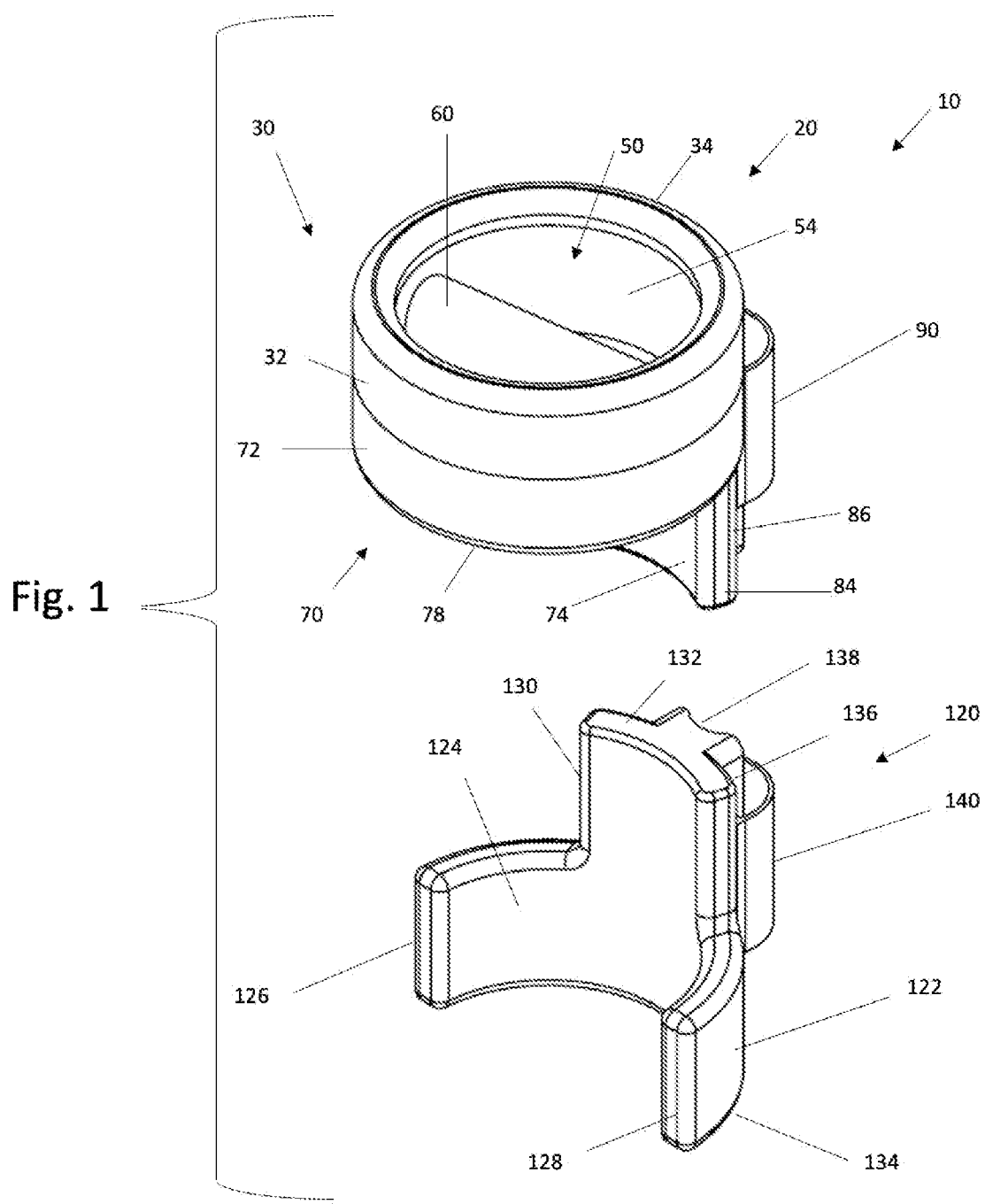
FIG. 1 is a front isometric view of the present invention.

Referring now to the drawings, the present invention is an adjustable fishing rod handle assembly, and is generally referred to with numeral 10. It can be observed that it basically includes handle assembly 20 and arm support assembly 120.

Figure 2:
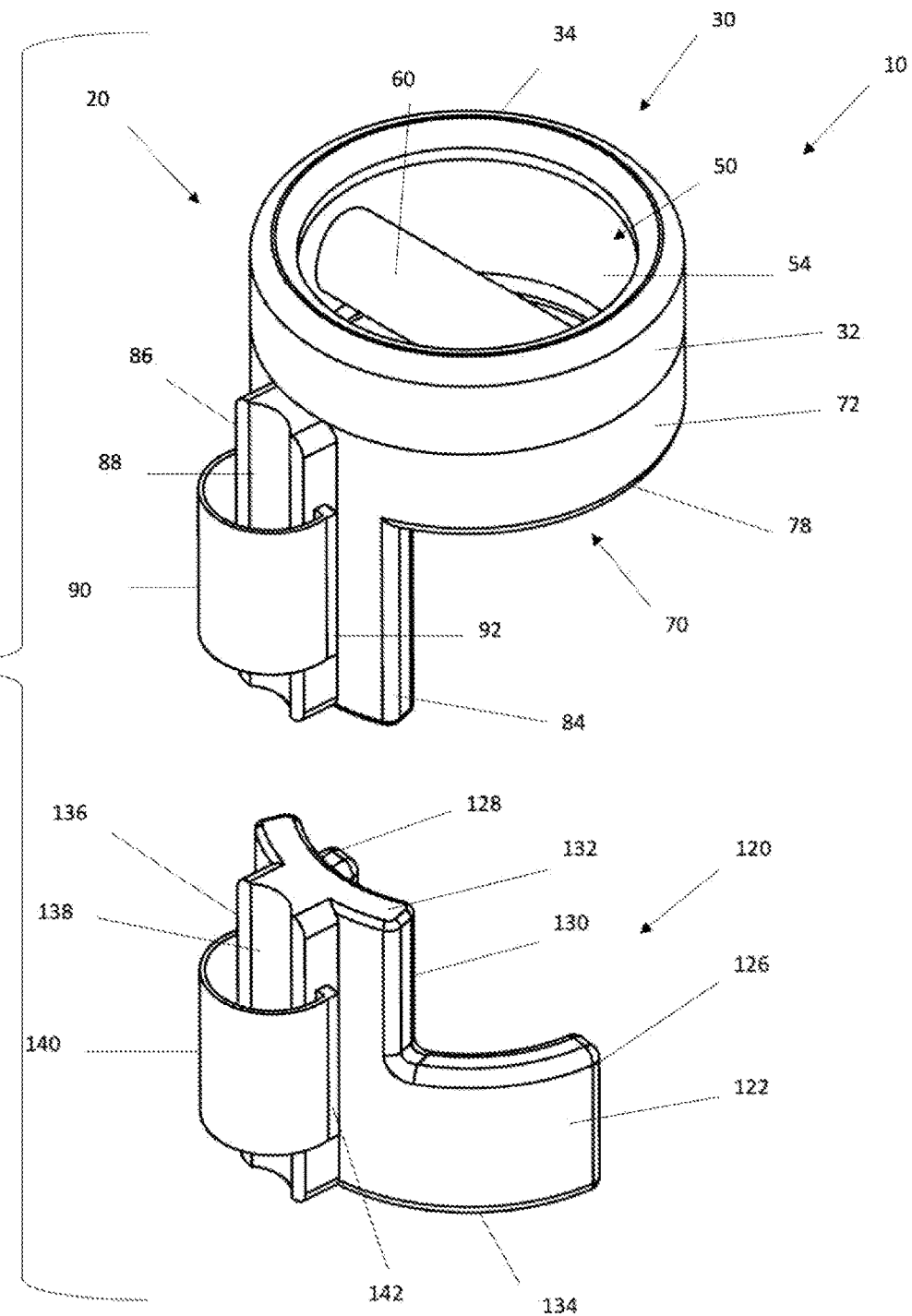
FIG. 2 is a rear isometric view of the present invention.

As seen in FIGS. 1 and 2, handle assembly 20 has upper member 30, interior bracket 50, and lower member 70. Upper member 30 and lower member 70 are coupled, and interior bracket 50 is positioned within upper member 50 and lower member 70. Upper member 30, interior bracket 50, and lower member 70 are ring-shaped. Arm support assembly 120 has curvature.

Figure 3:
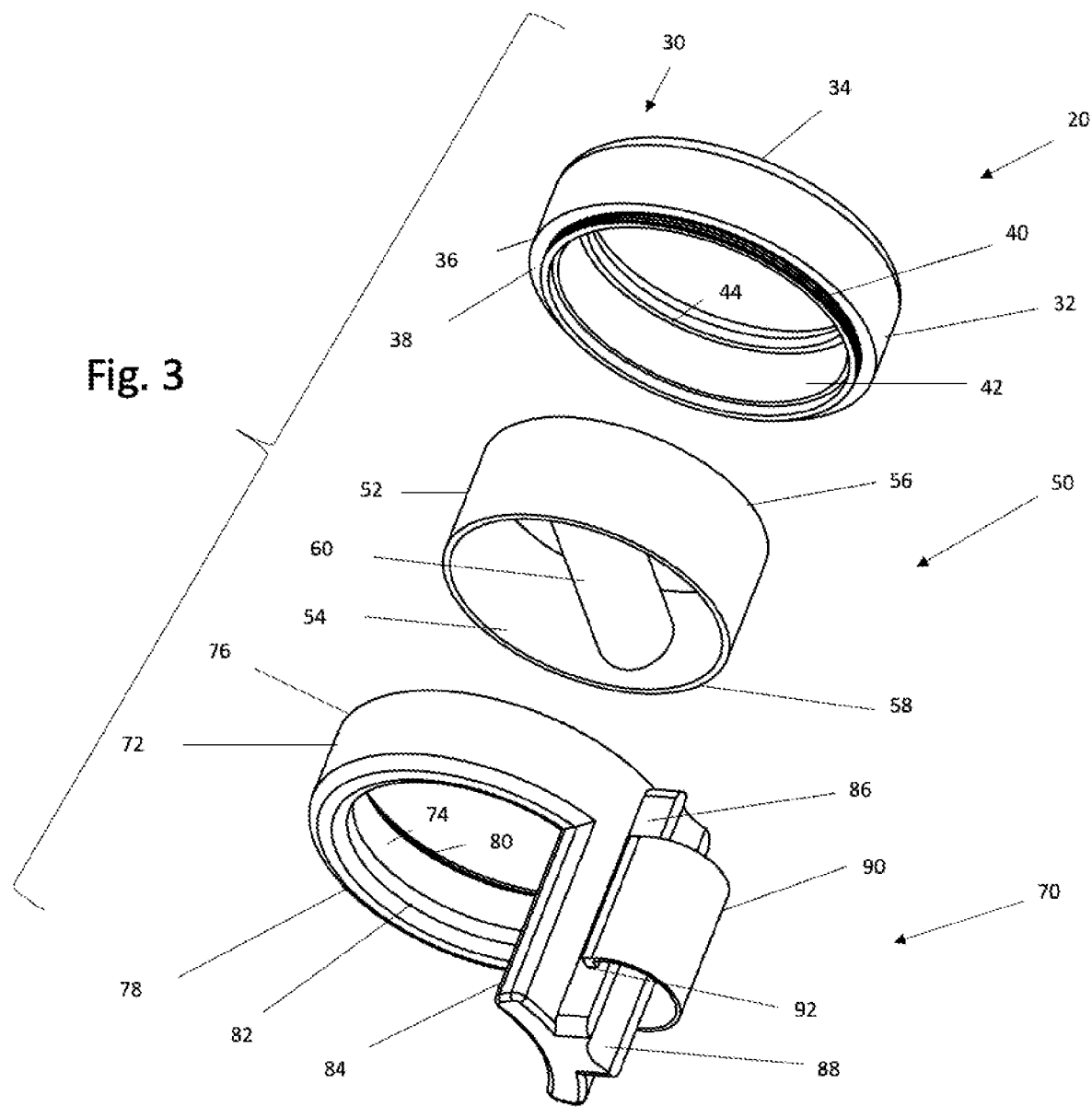
FIG. 3 is an exploded view of a handle assembly of the present invention.

As seen in FIG. 3, upper member 30 comprises upper member exterior face 32, upper member interior face 42, upper member top end 34, and upper member bottom end 36. Upper member top end 34 defines upper channel 44 towards upper member interior face 42. Upper member bottom end 36 defines lip 38 having external threads 40. Interior bracket 50 comprises bracket exterior face 52, bracket interior face 54, bracket top end 56, bracket bottom end 58, and handle 60. Handle 60 crosses diametrically at bracket interior face 54.

Lower member 70 comprises lower member exterior face 72, lower member interior face 74, lower member top end 76, lower member bottom end 78, and lower member elongated support 84. Lower member top end 76 defines internal threads 80 at lower member interior face 74. Lower member bottom end 78 defines lower channel 82 toward lower member interior face 74. Lower member elongated support 84 is substantially perpendicular to lower member bottom end 78. Lower member elongated support 84 comprises distal holder base 86 having distal holder channel 88 and distal aperture 92 to receive distal adjustable strap 90. Distal holder base 86 is at lower member exterior face 72. In a preferred embodiment, distal holder channel 88 is concave in shape.

When assembled, upper channel 44 receives bracket top end 56 and lower channel 82 receives bracket bottom end 58, allowing interior bracket 50 to freely rotate within upper member interior face 42 and lower member interior face 74. Internal threads 80 receive external threads 40 to secure upper member 30 to lower member 70.

Figure 4:
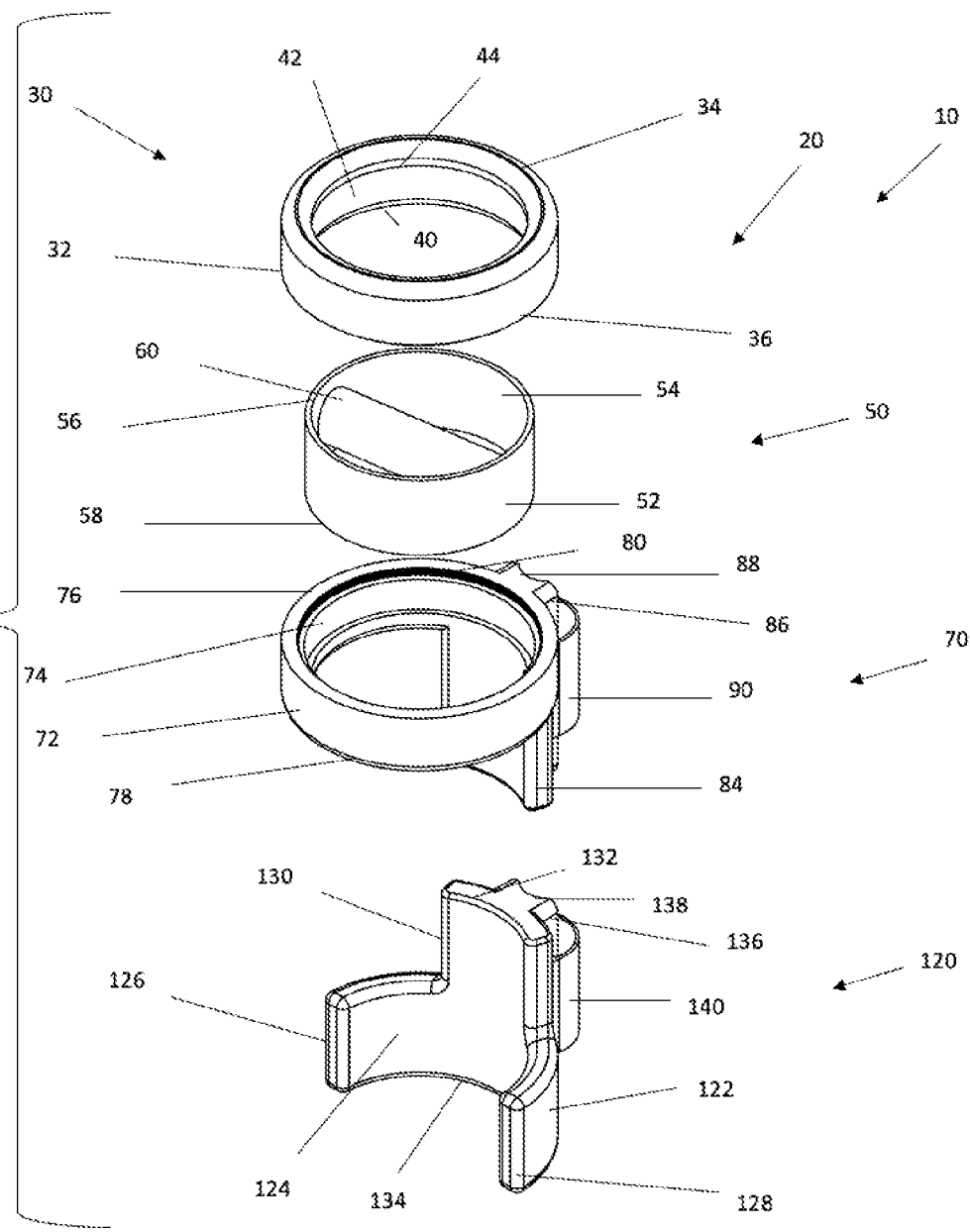
FIG. 4 is an exploded view from a front side of the present invention.
Figure 5:
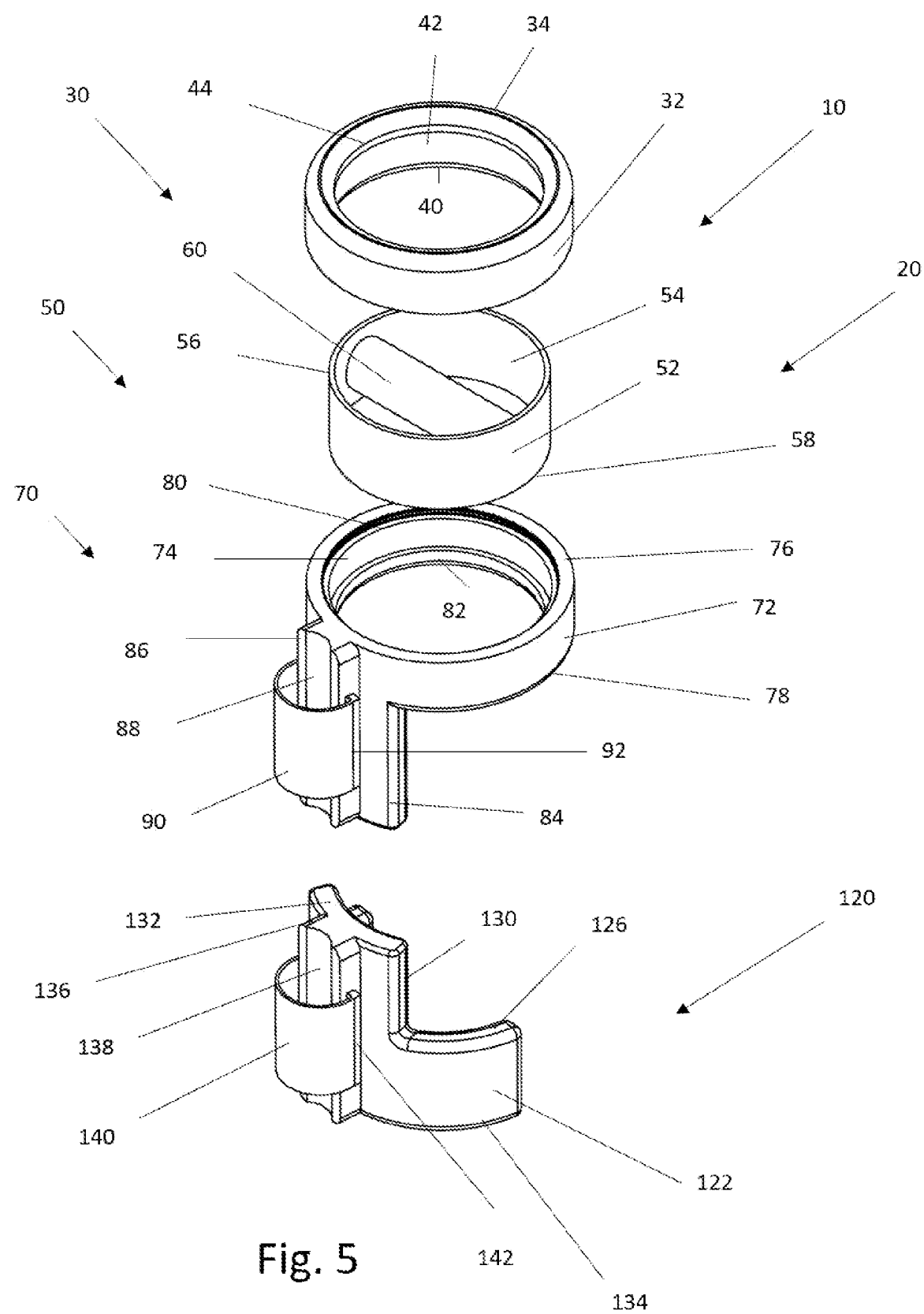
FIG. 5 is an exploded view from a rear side of the present invention.
Figure 6:
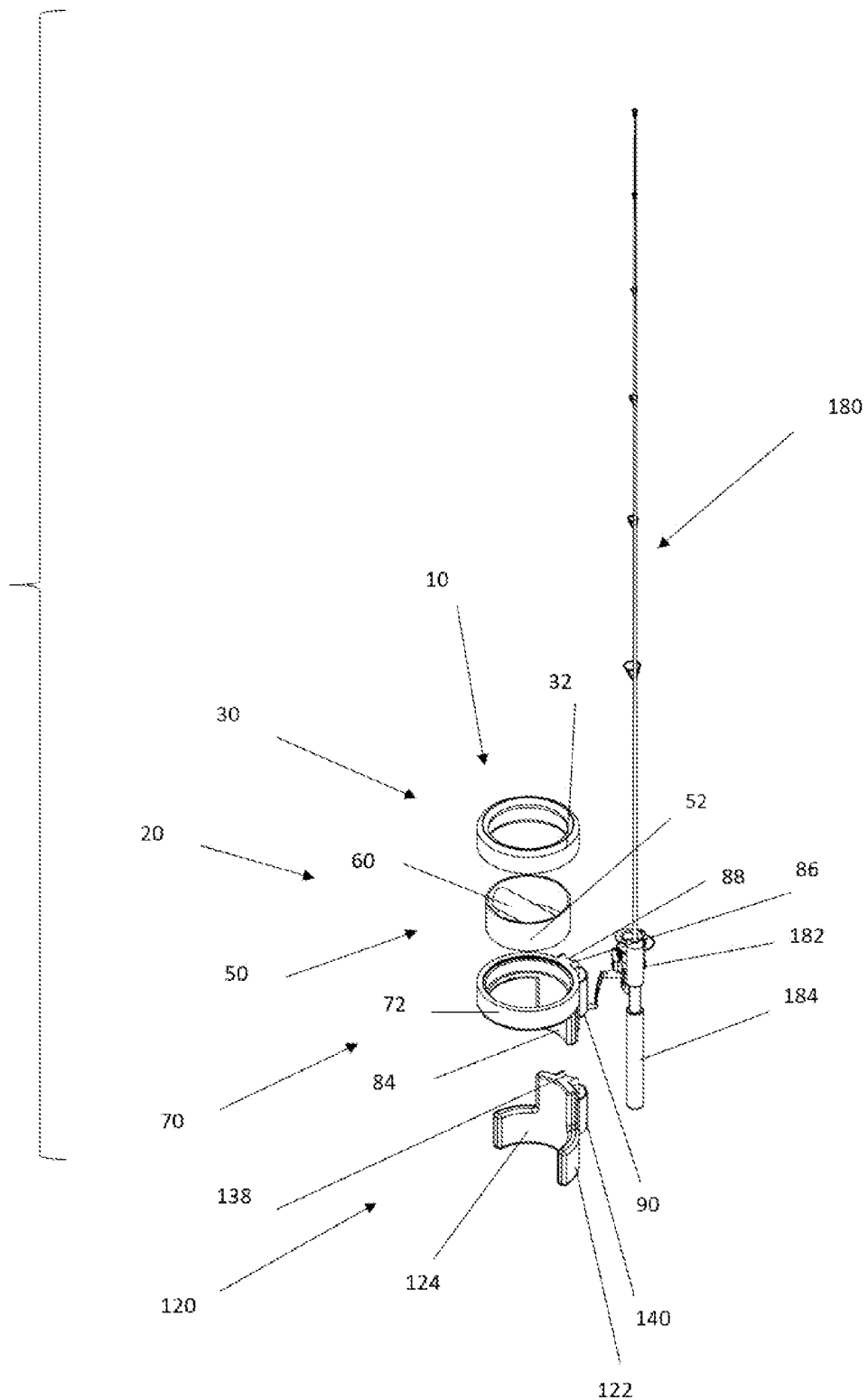
FIG. 6 is an isometric view showing the front side of the present invention and a fishing rod.
Figure 7:
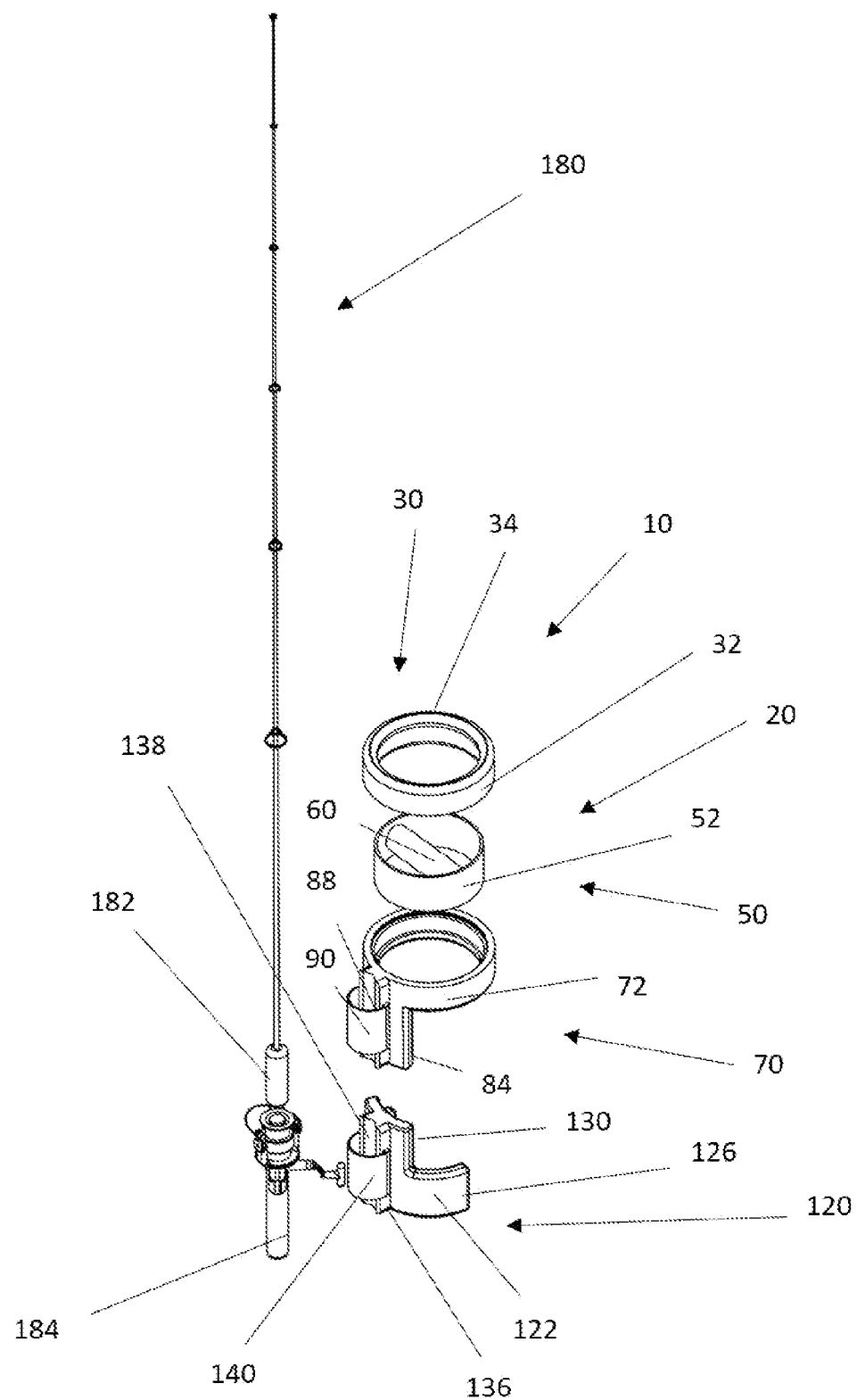
FIG. 7 is an isometric view showing the rear side of the present invention and a fishing rod.
Figure 8:
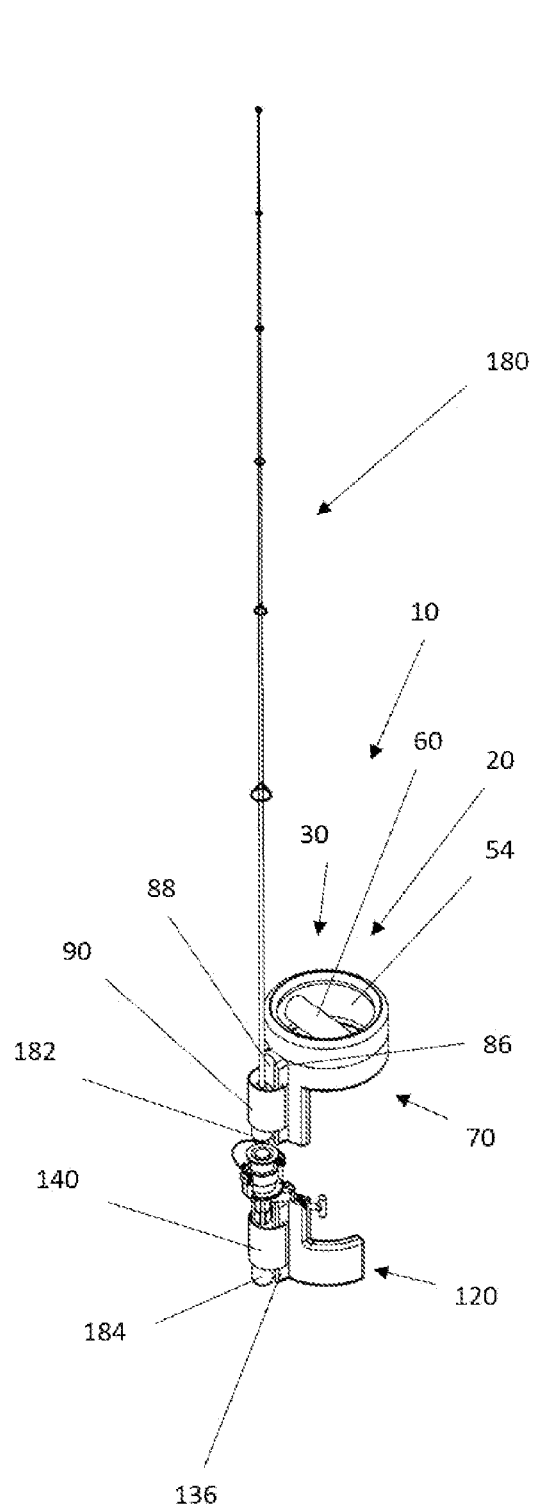
FIG. 8 is a rear isometric view of the present invention mounted onto a fishing rod.
Figure 9:
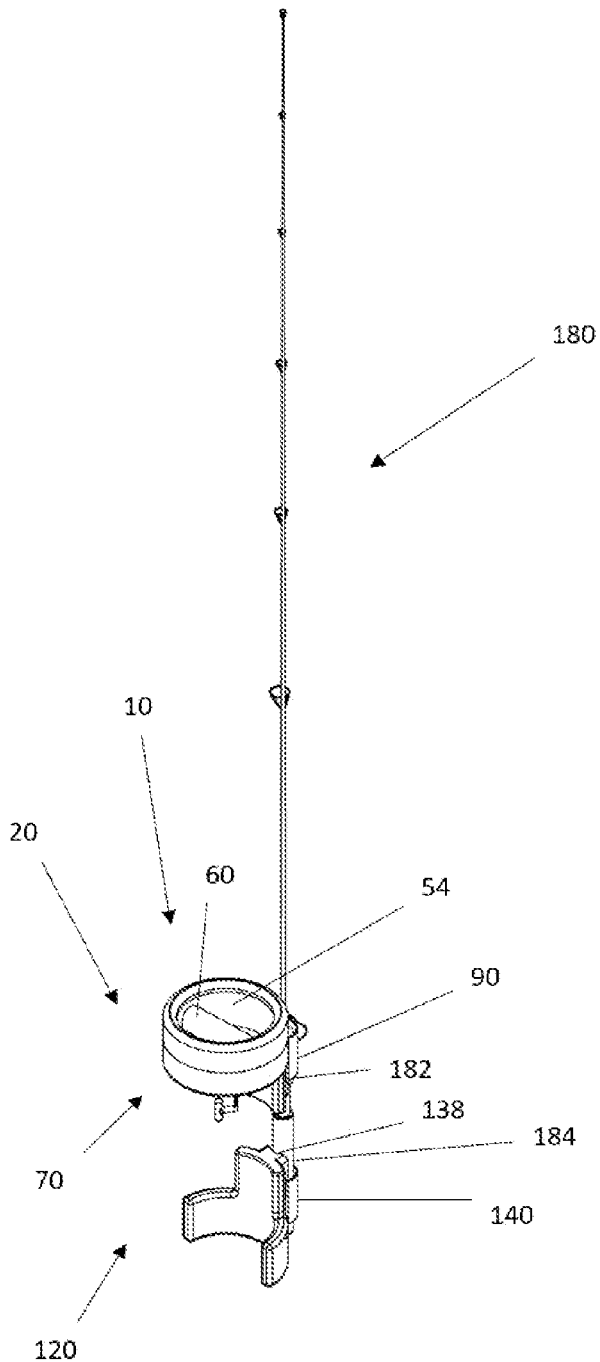
FIG. 9 is a front isometric view of the present invention mounted onto the fishing rod.

As seen in FIGS. 4 and 5, arm support assembly 120 comprises arm support exterior face 122, arm support interior face 124, first and second lateral supports 126 and 128, elongated support 130, arm support top end 132, and arm support bottom end 134. Elongated support 130 is substantially perpendicular to first and second lateral supports 126 and 128. In a preferred embodiment, arm support interior face 124 is concave to ergonomically receive a wrist/arm section of a user. Elongated support 130 comprises proximal holder base 136 having proximal holder channel 138 and proximal aperture 142. Proximal aperture 142 receives proximal adjustable strap 140. Proximal holder base 136 is at arm support exterior face 122.

As seen in FIGS. 6, 7, 8, and 9, handle assembly 20 and arm support assembly 120 are removable mounted onto fishing rod 180. Handle assembly 20 and arm support assembly 120 are mounted onto fishing rod 180 whereby distal adjustable strap 90 and proximal adjustable strap 140 secure fishing rod 180 to distal holder base 86 and proximal holder base 136 respectively. In a preferred embodiment, distal holder channel 88 receives grip 182 and proximal holder channel 138 receives grip 184. In a preferred embodiment, distal adjustable strap 90 and proximal adjustable strap 140 are hook and loop type straps, as an example VELCRO® straps.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An adjustable fishing rod handle assembly, comprising:
A) a handle assembly having an upper member, an interior bracket, and a lower member, whereby said upper member and said lower member are coupled, and said interior bracket is positioned within said upper member and said lower member, said upper member comprises an upper member exterior face, an upper member interior face, an upper member top end, and an upper member bottom end defining a lip having external threads, said interior bracket comprises a bracket exterior face, a bracket interior face, a bracket top end, a bracket bottom end, and a handle, said lower member comprises a lower member exterior face, a lower member interior face, a lower member top end, a lower member bottom end, and a lower member elongated support comprising a distal holder base having a distal holder channel and a distal aperture to receive a distal adjustable strap, said lower member bottom end defines a lower channel toward said lower member interior face and said upper member top end defines an upper channel toward said upper member interior face, said upper channel receives said bracket top end and said lower channel receives said bracket bottom end, whereby said interior bracket is able to rotate within said upper member interior face and said lower member interior face wherein said handle rotates about an axis parallel to the axis of said lower member elongated support and said distal adjustable strap; and
B) an arm support assembly, wherein said handle assembly and said arm support assembly are removably mounted onto a fishing rod, said upper member, said interior bracket, and said lower member are ring-shaped and said arm support assembly is curved, said arm support assembly comprises an arm support exterior face, an arm support interior face, first and second lateral supports, an elongated support, an arm support top end, and an arm support bottom end, said elongated support comprises a proximal holder base having a proximal holder channel and a proximal aperture to receive a proximal adjustable strap.

2. The adjustable fishing rod handle assembly set forth in claim 1, wherein said handle crosses diametrically at said bracket interior face.

3. The adjustable fishing rod handle assembly set forth in claim 1, wherein said lower member top end defines internal threads at said lower member interior face.

4. The adjustable fishing rod handle assembly set forth in claim 3, wherein said internal threads receive said external threads to secure said upper member to said lower member.

5. The adjustable fishing rod handle assembly set forth in claim 1, wherein said lower member elongated support is substantially perpendicular to said lower member bottom end.

6. The adjustable fishing rod handle assembly set forth in claim 1, wherein said distal holder base is at said lower member exterior face.

7. The adjustable fishing rod handle assembly set forth in claim 1, wherein said elongated support is perpendicular to said first and second lateral supports.

8. The adjustable fishing rod handle assembly set forth in claim 1, wherein said proximal holder base extends at said arm support exterior face.

9. The adjustable fishing rod handle assembly set forth in claim 1, wherein said handle assembly and said arm support assembly mount onto said fishing rod whereby said distal adjustable strap and said proximal adjustable strap secure said fishing rod to said distal holder base and said proximal holder base respectively.

* * * * *